May 28, 1957  R. D. ARGO  2,793,456
DUCK DECOY
Filed May 31, 1955
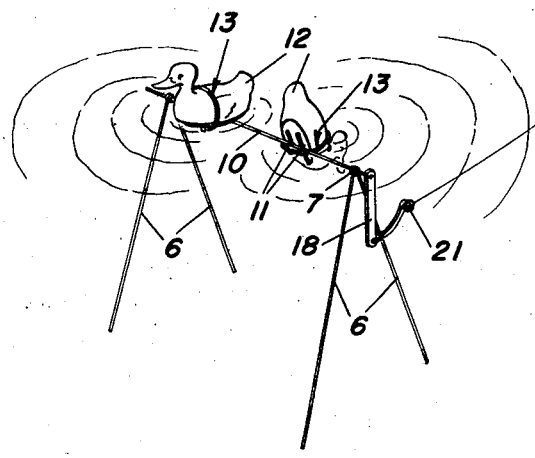
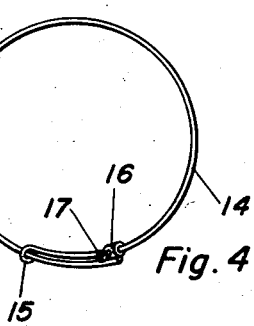
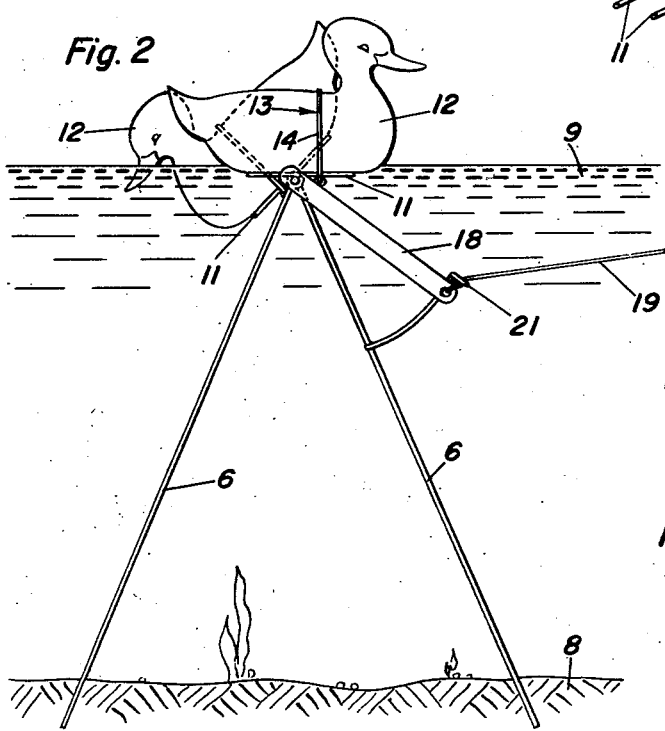
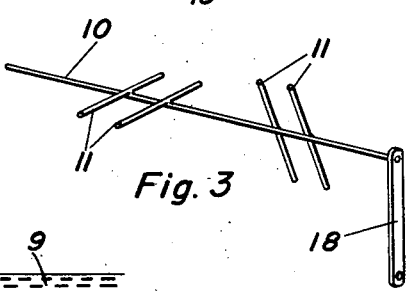
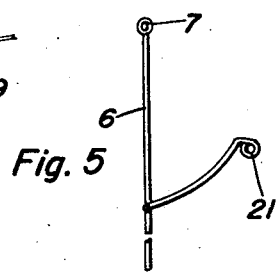
Riley D. Argo
INVENTOR.
BY

United States Patent Office 2,793,456
Patented May 28, 1957

2,793,456

DUCK DECOY

Riley D. Argo, Ridgely, Tenn.

Application May 31, 1955, Serial No. 512,186

7 Claims. (Cl. 43—3)

The present invention relates to new and useful improvements in duct decoys, and has for its primary object to provide, in a manner as hereinafter set forth, a device of this character which closely simulates the actions of ducks when feeding.

Another important object of the invention is to provide a duck decoy of the aforementioned character which is operable from a blind located at any desired point.

Other objects of the invention are to provide a duck decoy of the character described which will be comparatively simple in construction, strong, durable, compact, and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing a duck decoy embodying the present invention in use or operation;

Figure 2 is a view in side elevation thereof;

Figure 3 is a perspective view of the decoy supporting unit;

Figure 4 is a detail view in elevation of one of the resilient decoy clamps; and Figure 5 is a detail view in side elevation of one of the supporting legs or rods.

Referring now to the drawing in detail, it will be seen that the embodiment of the invention which has been illustrated comprises upwardly converging pairs of supporting rods or legs 6 of suitable metal, which rods may be of any desired length and diameter. At the upper ends thereof, the rods 6 terminate in aligned eyes or bearings 7. As shown to advantage in Figure 2 of the drawing, the rods 6 are adapted to be embedded in the bottom 8 of a body of water, as at 9, with the eyes 7 just below the surface.

A horizontal shaft 10 of suitable metal is journaled in the eyes 7. Oppositely inclined pairs of spaced bars 11 are affixed transversely to the shaft 10. Oppositely facing decoy ducks 12 are removably secured in position on the pairs of bars 11 through the medium of clamps 13 in the form of split, resilient rings 14 of suitable metal, preferably copper.

In the embodiment shown, the ring 14 terminates at one end in a loop 15 through which the other end portion of said ring is slidable. Then, mounted on said other end portion of the ring 14 is a sleeve 16 through which said one end portion of said ring is slidable. A setscrew 17 is threadedly mounted on the sleeve 16 for securing the adjustment of the ring 14.

Fixed on one end portion of the shaft 10 is an arm 18. An operating cord 19, operable from a blind, as indicated at 20, is connected to the arm 18. The cord 19 is slidable through a combination stop and guide 21 which is provided therefor on the adjacent rod 6.

It is thought that the operation of the device will be readily apparent from a consideration of the foregoing. Briefly, when one of the decoys 12 is in a substantially horizontal position on the water 9, the other decoy is dipped into the water in close simulation of a feeding duck, as seen in Figure 1 of the drawing. Then, by rocking the shaft 10 by pulling on the cord 19, the submerged decoy is swung to a substantially horizontal position on the surface of the water, and the horizontal decoy is submerged or dipped. Rotation of the shaft 10 by the cord 19 is positively limited by the member 21 which is located in the path of the arm 18 and engageable thereby. When tension on the line 19 is relaxed the arm 18 returns the decoys 12 to the position of Figure 1 of the drawing by gravity. The foregoing operation may, of course, be repeated as frequently as desired. Any suitable decoys may be mounted on the rockable shaft 10. The number of decoys may also be varied as desired. A return spring may be connected to arm 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restorted to, falling within the scope of the invention as claimed.

What is claimed as new is as follows:

1. A duck decoy of the character described comprising: a supporting structure, a rockable shaft journaled horizontally on said supporting structure, a pair of oppositely facing decoy ducks fixedly mounted transversely on the shaft, and means for rocking said shaft.

2. A duck decoy of the character described comprising: a supporting structure, a rockable shaft journaled horizontally on said supporting structure, a pair of oppositely facing decoy ducks mounted transversely on the shaft, and means for rocking said shaft, said means including an arm fixed on the shaft, a guide mounted on the supporting structure, and a cord slidable through the guide and connected to the arm, said guide being engageable by said arm for limiting the rotation of the shaft in one direction.

3. A duck decoy of the character described comprising: a supporting structure to be erected in a body of water, a shaft rockably mounted on the supporting structure adjacent the surface of the water, a pair of oppositely inclined, oppositely facing decoy ducks mounted transversely on the shaft, and means for rocking the shaft for alternately dipping the decoy ducks into the water.

4. A duck decoy of the character described comprising: a supporting structure to be erected in a body of water, a shaft rockably mounted on the supporting structure adjacent the surface of the water, a pair of oppositely inclined, oppositely facing decoy ducks mounted transversely on the shaft, and means for rocking the shaft for alternately dipping the decoy ducks into the water, said means including an arm fixed on the shaft, an operating cord connected to the arm, and a guide for the cord mounted on the supporting structure and engageable by the arm for limiting rotation of the shaft in one direction.

5. A duck decoy of the character described comprising: a supporting structure including pairs of upwardly converging rods to be erected in a body of water, aligned eyes on the upper ends of the rods adjacent the surface of the water, a shaft journaled for rocking movement in said eyes, a pair of oppositely facing, oppositely inclined decoy ducks mounted transversely on the shaft at spaced points, and means for rocking the shaft for alternately dipping the decoy ducks into the water.

6. A duck decoy of the character described comprising: a supporting structure including pairs of upwardly converging rods to be erected in a body of water, aligned eyes on the upper ends of the rods adjacent the surface of the water, a shaft journaled for rocking movement in said eyes, a pair of oppositely facing, oppositely inclined decoy ducks mounted transversely on the shaft at spaced points, and means for rocking the shaft for alternately dipping the decoy ducks into the water, said means comprising an arm fixed on one end portion of the shaft, an operating cord connected to said arm, and a guide mounted on one of the rods, said cord extending slidably through the guide, said guide being engageable by the arm for limiting the rotation of the shaft in one direction.

7. A duck decoy of the character described comprising: a supporting structure to be erected in a body of water, a shaft journaled on said supporting structure, oppositely inclined pairs of bars mounted transversely on said shaft, oppositely facing decoy ducks mounted on said pairs of bars, and clamps comprising resilient rings removably securing said decoy ducks on said pairs of bars.

References Cited in the file of this patent

UNITED STATES PATENTS

| | | |
|---|---|---|
| 1,831,286 | Chelini | Nov. 10, 1931 |
| 2,547,286 | Sabin | Apr. 3, 1951 |